United States Patent

Miura et al.

[11] Patent Number: 6,026,070
[45] Date of Patent: Feb. 15, 2000

[54] OPTICAL PICKUP DEVICE

[75] Inventors: Akira Miura; Shinichi Takahashi, both of Tokorozawa, Japan

[73] Assignee: Pioneer Electronic Corporation, Tokyo, Japan

[21] Appl. No.: 08/984,158

[22] Filed: Dec. 3, 1997

[30] Foreign Application Priority Data

Dec. 6, 1996 [JP] Japan .................................... 8-327115
Nov. 12, 1997 [JP] Japan .................................... 9-310389

[51] Int. Cl.$^7$ .................................................. G11B 7/135
[52] U.S. Cl. .............................. 369/110; 369/112; 369/13
[58] Field of Search .................................... 369/110, 112, 369/111, 109, 100, 44.12, 44.14, 13

[56] References Cited

U.S. PATENT DOCUMENTS

| | | | |
|---|---|---|---|
| 5,742,577 | 4/1998 | Horimai et al. | 369/110 X |
| 5,790,502 | 8/1998 | Horinouchi et al. | 369/112 |
| 5,903,529 | 5/1999 | Nishi et al. | 369/112 X |

*Primary Examiner*—Muhammad Edun
*Attorney, Agent, or Firm*—Sughrue, Mion, Zinn, Macpeak & Seas, PLLC

[57] ABSTRACT

An optical pickup device using a polarizing optics system is characterized in that the polarization beam splitter comprises a polarizing film having optical properties of transmittance and reflectivity satisfying the following formulas (1) and (2):

$$T_P \times \{D_S \times R_S + D_P \times (1-T_P)\} \geq I_B \quad (1)$$
$$T_P \times R_S \geq 22 I_B \quad (2)$$

under conditions $T_P + R_P = 1$ and $R_S + T_S = 1$ except an absorbancy, wherein $T_P$ denotes a transmittance of a P-polarized light component in the incident light, $T_S$ denotes a transmittance of a S-polarized light component in the incident light, $R_P$ denotes a reflectivity of a P-polarized light component in the incident light, $R_S$ denotes a reflectivity of a S-polarized light component in the incident light, $I_B$ denotes an optical intensity of a returned light in a non-polarizing optics system existing if both the polarization beam splitter of the polarizing optics system and the quarter-wave plate are replaced by the non-polarization beam splitter, $D_P$ denotes a ratio of the P-polarized light component in the incident light of a reflected light from the optical disc to the polarization beam splitter, and $D_S$ denotes a ratio of the S-polarized light component in the incident light of a reflected light from the optical disc to the polarization beam splitter.

2 Claims, 3 Drawing Sheets

OPTICAL PICKUP DEVICE

BACKGROUND OF THE INVENTION

1. Field of the Invention

The present invention relates generally to an optical pickup device for used in an optical information recording/reproducing apparatus.

2. Description of the Related Art

The optical pickup devices are roughly classified into two sorts that one employs a polarizing optics system and the other employs a non-polarizing optics system.

For example, FIG. 1 shows an optical pickup device with a polarizing optics system using an astigmatism method.

A semiconductor laser 1 irradiates a laser beam which is a linearly polarized light to a collimator lens 2. The collimator lens 2 transforms this laser beam into a parallel laser beam which travels through a polarization beam splitter 3 and a quarter-wave plate 3a. The quarter-wave plate 3a converts the laser beam linearly polarized light into a circularly polarized light. An objective lens 4 converges the circularly polarized light beam toward an optical disc 5 to form a light spot onto a pit train on an information recording surface of the optical disc 5.

An optical disc 5 reflects the circularly polarized light back to the objective lens 4. The objective lens 4 converges the reflected light to the quarter-wave plate 3a in which the circularly polarized light is converted to a linearly polarized light (which has a plane of vibration perpendicular to that of the original linearly polarized light). This returned linearly polarized light travels through the polarization beam splitter 3. The polarizing film of the polarization beam splitter 3 reflects and directs the linearly polarized light to a detecting lens 7. The detecting lens 7 converges the linearly polarized light to a cylindrical lens 8, serving as an astigmatism generating element, to form a light spot near the center of a light receiving surface of a quadrant photodetector 9 having four light receiving surface areas (elements) divided by two orthogonal line segments.

The quadrant photodetector 9 opto-electrically transduces the light spot irradiated to the four light receiving surface areas into respective electric signals to supply them a demodulating circuit 12a and an error detecting circuit 12b. The demodulating circuit 12a generates an electric data signal on the basis of the supplied signals. The error detecting circuit 12b generates a focus error signal and a tracking error signal based on the electric signals supplied from the quadrant photodetector 9 and supplies these error signals to an actuator driver circuit 13. The actuator driver circuit 13 supplies a corresponding driving signals to an actuator 15. The actuator 15 drives and servo-controls the objective lens 4 in response to the driving signal.

On the other hand, FIG. 2 shows the other optical pickup device in which the non-polarizing optics having a small polarization i.e., a small difference between the S- and P-polarized light components such as a half mirror 3b (in which a transmittance T is nearly equal to a reflectivity R) is employed instead of the optical isolator having a combination of both the polarization beam splitter and the quarter-wave plate as shown in FIG. 1.

A polarization beam splitter included in the polarizing optics system has a polarizing film comprising a multilayer dielectric layer which has an optical characteristics such that a transmittance for a P-polarized light component $T_P$ is nearly equal to 1, a transmittance a for S-polarized light component $T_S$ is nearly equal to 0, a reflectivity for a P-polarized light component $R_P$ is nearly equal to 0, and a reflectivity for a S-polarized light component $R_S$ is nearly equal to 1. In addition, a quarter-wave plate comprising a uniaxial crystal is disposed in such a manner that the principal plane of the quarter-wave plate is in an angle 45 degree with respect to a plane of vibration of the P-polarized light entering thereinto. This combination of the polarization beam splitter and the quarter-wave plate is an optical isolator which changes the polarizing directions of light in the forward and back optical paths. Therefore, the polarization beam splitter divides the P-polarized light in the forward optical path and the S-polarized light in the back optical path. This polarizing optics system has an advantageous effect of a high optical utility efficiency in comparison with a non-polarizing optics system.

In a two focus pickup device used in a compatible player for a digital video disc (DVD) and compact disc (CD), such a polarizing optics system with a high optical utility efficiency is employed to compensate a reduction of diffraction light intensity caused by the usage of hologram which separates the zero order diffraction light for DVD and the primary order diffraction light for CD.

Whereas, a transparent substrate for an optical disc such as CD is generally made of a thermoplastic resin such as polycarbonate. In this case, the thermoplastic resin is injection-molded into a die of a master disc or stamper to form the substrate. Since it is difficult to homogeneously expand the resin in the stamper, unevenness of thickness appears in the resultant transparent substrate after the manufacturing process. Such an unevenness of thickness of the substrate causes a double refraction with respect to the light beam irradiated to the optical disc.

In the pickup device, a reflected light returned from an optical disc with a double refraction through the quarter-wave plate does not have mainly an S-polarized light component. There is a problem that the optical intensity on the photodetector is reduced to a level lower than that of a non-polarizing optics system although the polarizing optics system is employed.

SUMMARY OF THE INVENTION

The present invention has been made in view of the problem mentioned above, and its object is to provide an optical pickup device with a polarizing optics system in which photodetectors are capable of favorably receiving a large optical intensity of a returned light from an optical disc which larger than that of a non-polarizing optics system even though such an optical disc have a large double refraction.

The present invention provides an optical pickup device comprising:

a light source which mainly irradiates a linearly polarized light;

a polarizing optics system including a polarization beam splitter and a quarter-wave plate for receiving the linearly polarized light and converting the linearly polarized light into a circularly polarized light as a incident light;

an objective lens for receiving and irradiating said incident light to an optical disc which collects a reflected light from the optical disc and returns the reflected light back to said polarizing optics system; and said polarizing optics system which converts the reflected light circularly polarized into a linearly polarized light as a returned light to divide the returned light from a optical path of the incident light to introduce the returned light onto a photodetector, characterized in that said polarization beam splitter comprises a polarizing film having optical properties of transmittance and reflectivity satisfying the following formulas (1) and (2):

$$T_P \times \{D_S \times R_S + D_P \times (1-T_P)\} \geq I_B \tag{1}$$

$$T_P \times R_S \geq 2I_B \tag{2}$$

under conditions $T_P + R_P = 1$ and $R_S + T_S = 1$ except an absorbency, wherein $T_P$ denotes a transmittance of a P-polarized light component in said incident light, $T_S$ denotes a transmittance of a S-polarized light component in said incident light, $R_P$ denotes a reflectivity of a P-polarized light component in said incident light, $R_S$ denotes a reflectivity of a S-polarized light component in said incident light, $I_B$ denotes an optical intensity of a returned light in a non-polarizing optics system existing if both said polarization beam splitter of said polarizing optics system and said quarter-wave plate are replaced by the non-polarization beam splitter, $D_P$ denotes a ratio of the P-polarized light component in said incident light of a reflected light from said optical disc to said polarization beam splitter, and $D_S$ denotes a ratio of the S-polarized light component in said incident light of a reflected light from said optical disc to said polarization beam splitter.

In optical pickup device according to the invention, it is preferable that said transmittance $T_P$ of said P-polarized light component to said reflectivity $R_P$ of said P-polarized light component of $T_P:R_P$ in said polarizing film has a ratio less than 10:1.

According to the optical pickup device of the invention, the photodetectors in the optical pickup device with a polarizing optics system are capable of receiving a large optical intensity of a returned light from an optical disc having a large double refraction, which intensity being larger than that of a non-polarizing optics system. Therefore, there is prevented from reduction of a reproduced signal quality due to the double refraction in the optical pickup device. Particularly, it is favorable in the two focus pickup device which need to employ a polarizing optics system.

DESCRIPTION OF THE PREFERRED EMBODIMENTS

The present invention will hereinafter be described in conjunction with preferred embodiments thereof with reference to the accompanying drawings.

The inventors have studied the polarizing optics system of the optical pickup device, and particularly investigated reflectivities and transmittances of polarized light components in the polarization beam splitter. As a result, the inventors have revealed that a ratio of S-polarized light component is smaller than half of all components in the reflected light returned from an optical disc with a large double refraction, i.e., in a incident light to the polarization beam splitter in comparison with the P-polarized light component and the S-polarized light component. Therefore, the inventors have made the invention to enlarge the extraction of S-polarized light component from the returned light in the optical pickup device.

Figure 3:
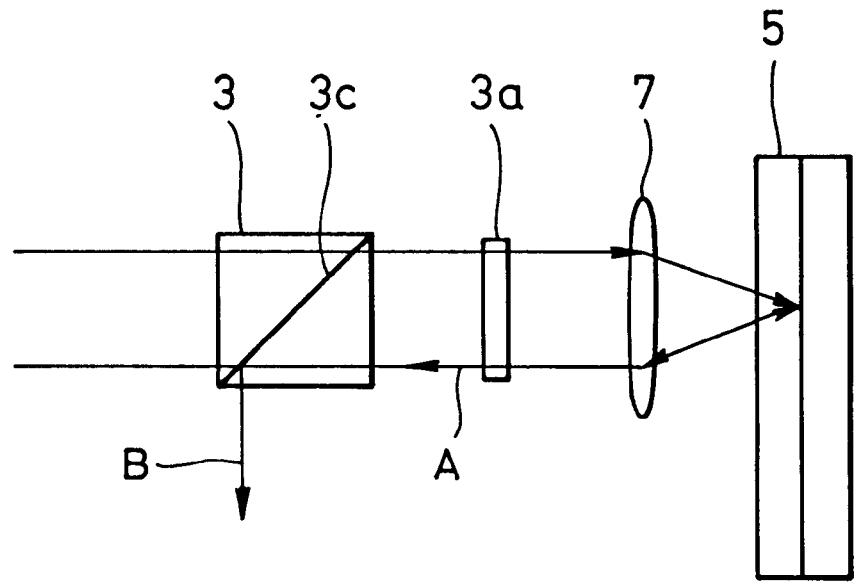
FIG. 3 is a schematic diagram briefly illustrating the structure of the polarizing optics system.

A polarizing optics system for the optical pickup device is generally constructed such that a polarization beam splitter 3 and a quarter-wave plate 3a are employed for dividing the forward and backward optical paths as shown in FIG. 3.

Optical properties of the polarization beam splitter are defined as follows:

$T_P$: a transmittance of a P-polarized light component in the incident light, $T_S$: a transmittance of an S-polarized light component in the incident light, $R_P$: a reflectivity of a P-polarized light component in the incident light, $R_S$: a reflectivity of an S-polarized light component in the incident light.

Furthermore, $D_P$ denotes a ratio of the P-polarized light component in the incident light of a reflected light (A) from the optical disc 5 to the polarization beam splitter 3. $D_S$ similarly denotes a ratio of the S-polarized light component in the incident light of the reflected light (A) from the optical disc 5 to the polarization beam splitter 3.

In this case, the incident light (A) to the polarization beam splitter i.e., the reflected light returned from the optical disc is usually a P-linearly polarized light. Therefore the optical intensity $I_A$ of light passing through the polarization beam splitter 3 is represented by $1 \times T_P = T_P$.

Further, the optical intensity $I_A$ of light passing through the quarter-wave plate 3a the polarization beam splitter 3 is represented by $I_A = T_P \times (D_P + D_S)$ except for an optical loss such as absorbancy.

Figure 1:
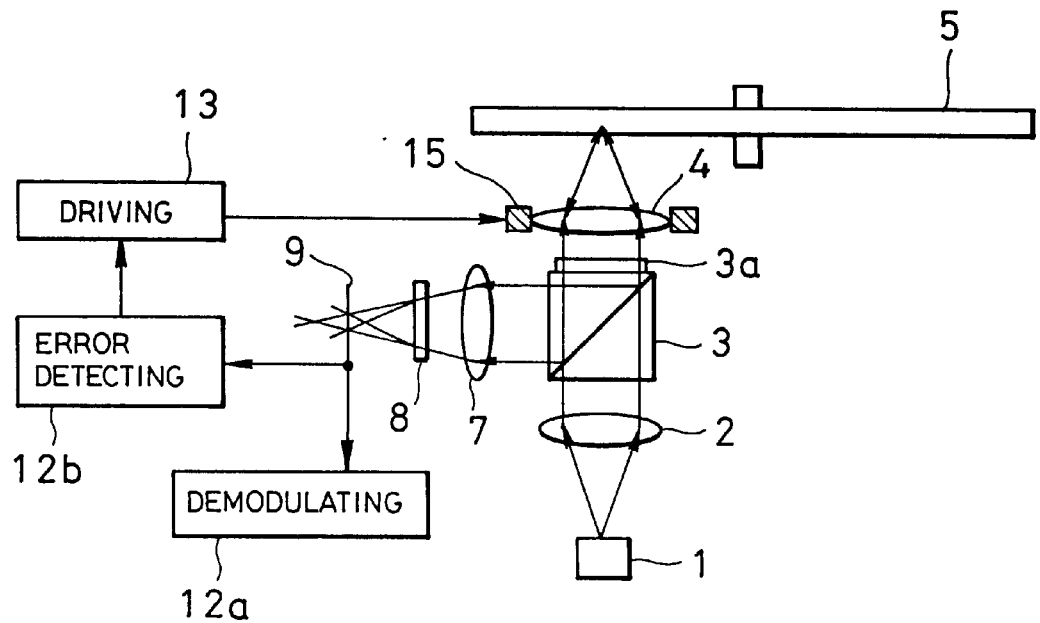
FIG. 1 is a schematic diagram illustrating the structure of an optical pickup device with a polarizing optics system.
Figure 2:
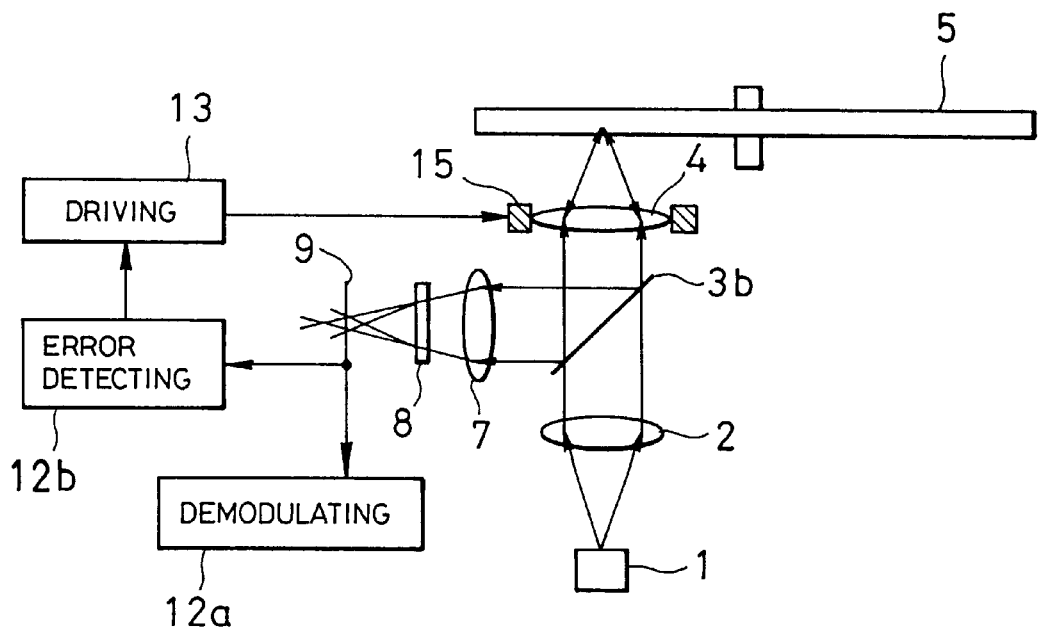
FIG. 2 is a schematic diagram illustrating the structure of an optical pickup device with a non-polarizing optics system.

The optical intensity $I_B$ of light (B) entering the polarization beam splitter 3 and being reflected by a polarizing film 3c and directed to the photodetector 9 (see FIG. 1) is represented by $I_B = T_P \times (D_P \times R_P + D_S \times R_S)$.

Figure 4:
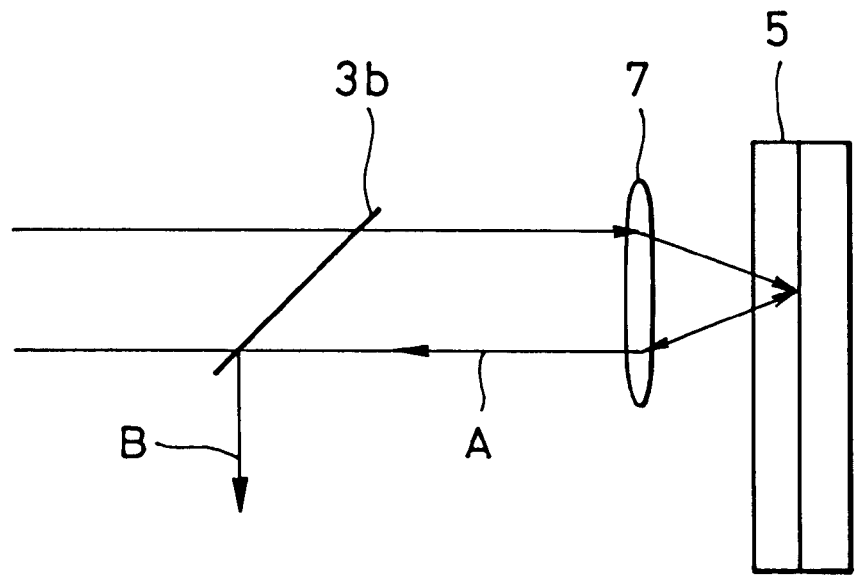
FIG. 4 is a schematic diagram briefly illustrating the structure of the non-polarizing optics system.

On the other hand, a non-polarizing optics system for the optical pickup device is generally constructed as shown in FIG. 4 in which the polarization beam splitter 3 shown in FIG. 3 is replaced by a half mirror 3b and the quarter-wave plate 3a shown in FIG. 3 is omitted.

This half mirror probably employs a non-polarizing film having one of the following optical properties (1) to (3) with respect to $T_P$, $T_S$, $R_P$ and $R_S$.

$$T_P = T_S = R_P = R_S = 0.5 \tag{1}$$

$$T_P = T_S = 0.55,\ R_P = R_S = 0.45 \tag{2}$$

$$T_P = T_S = 0.65,\ R_P = R_S = 0.35 \tag{3}$$

In such a non-polarizing optics system shown in FIG. 4, the optical intensity $I_B$ of the returned light (B) is not influenced by the polarized light component of the returned light (A). For example, the optical intensities $I_B$ of the returned light (B) corresponding to the above (1), (2) and (3) are represented by the following values (1), (2) and (3) respectively. In this case, assuming that an optical intensity of the incident light is 1, and therefore, $$I_B = T_P \times (D_P \times R_P + D_S \times R_S),\ D_P + D_S = 1,\ \text{and}$$

$$I_B=T_P\times\{D_P\times R_P+(1-D_P)\times R_S\}=T_P\times R_S. \ (\because R_P=R_S)$$

$$I_B=0.5\times0.5=0.25 \qquad (1)$$

$$I_B=0.55\times0.45=0.2475 \qquad (2)$$

$$I_B=0.65\times0.35=0.2275. \qquad (3)$$

In this way, polarized light components of the returned lights (A) and (B) vary due to the reflection and passage on many optical parts such as an optical disc and so on in the optics system. The returned light comprises S- and P-polarized light components, although light passing through the polarization beam splitter has only the P-polarized light component.

Assuming an ideal polarization beam splitter, usually $T_P=R_S=1$, $T_S=R_P=0$, therefor $I_B=T_P\times(D_P\times R_P+D_S\times R_S)=D_S$.

In a practical polarizing optics system for the optical pickup device, a polarization beam splitter generally employs a polarizing film having a ratio of the transmittance $T_P$ of the P-polarized light component to the reflectivity $R_P$ of the P-polarized light component i.e., $T_P:R_P$ being approximately 50:1.

However, when an optical disc with a large double refraction is used in the polarizing optics system, the ratio of the P-polarized light component to the S-polarized light component ($D_P:D_S$) becomes approximately 0.75:0.25 for example. Namely, a returned light with approximately $D_P=0.75$ and $D_S=0.25$ is obtained.

In this case, the polarizing optics system obtains only an optical intensity nearly equal to that of a non-polarizing optics system although using the polarizing optics system.

When $D_S$ becomes smaller more, there occurs an inversion that the optical intensity obtained by the polarizing optics system is smaller than that of the non-polarizing optics system.

In view of the above phenomenon, the optical properties of transmittance and reflectivity T, R of the polarizing film used in the polarization beam splitter are estimated in such a manner that a returned light's intensity $I_B$ becomes larger than that of the non-polarizing optics system even if an optical disc with a large double refraction is used, and the same time, the intensity $I_B$ becomes larger twice than that of the non-polarizing optics system when an ideal optical disc is used. As a result, the following relationships (1) and (2) are obtained.

$$T_P\times\{D_S\times R_S+D_P\times(1-T_P)\}\geq I_B \qquad (1)$$

$$T_P\times R_S\geq 2I_B \qquad (2)$$

$$(\because R_P+T_P=1)$$

Figure 5:
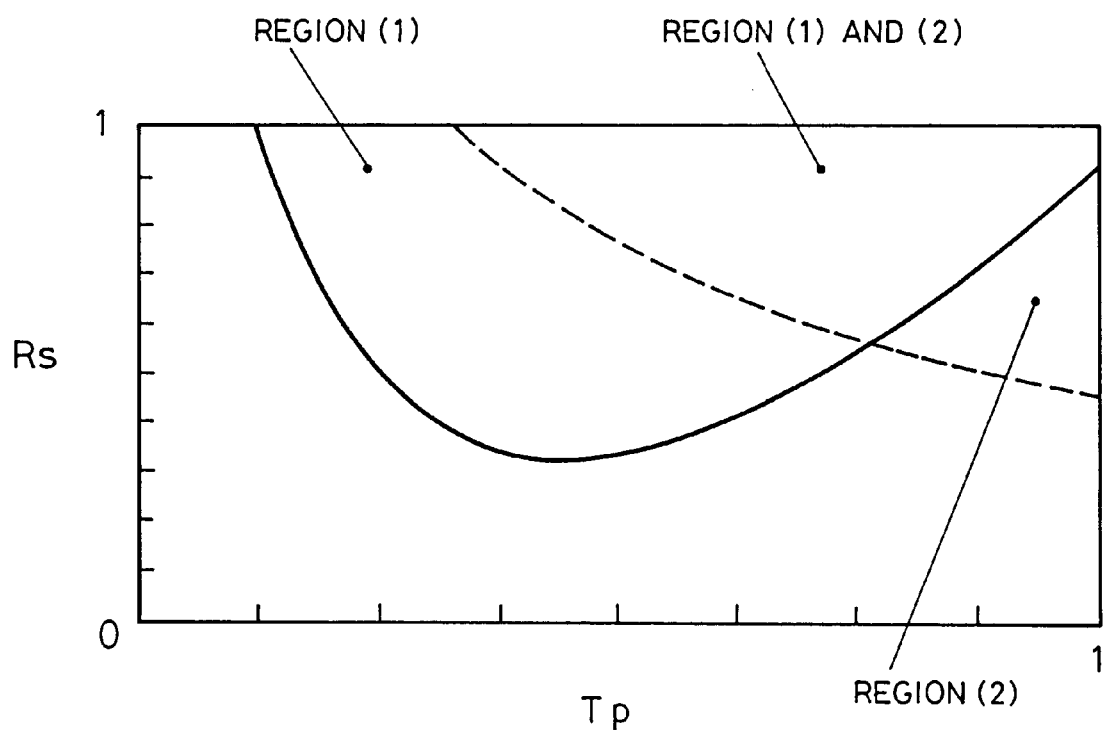
FIG. 5 is a graph showing a relationship of $T_P$ and $R_S$ of a polarization beam splitter in an optical pickup device's polarizing optics system according to the invention.

FIG. 5 shows a graph illustrating a relationship of $T_P$ and $R_S$ of the polarizing film used in a polarization beam splitter in an optical pickup device's polarizing optics system, while using the above formulas (1) and (2). In this case, for example, this is performed under the conditions that a returned light's intensity $I_B$ based on the half mirror is approximately ¼ and, a reflected light's $D_P$ is approximately ¾ and, its $D_S$ is approximately ¼ when an optical disc with a large double refraction is used. The above formulas (1) and (2) correspond to the regions (1) and (2) shown in FIG. 5 respectively.

Therefore, when $T_P$ are $R_S$ are set in the overlapped regions (1) and (2) for the polarizing film, the optical pickup device is able to obtain a needed minimum optical intensity even if the optical disc with a large double refraction is used therein.

In addition, the optical pickup device according to the invention is able to obtain a needed minimum optical intensity without using a polarizing film having a ratio of the transmittance $T_P$ of the P-polarized light component to the reflectivity $R_P$ of the P-polarized light component i.e., $T_P:R_P$ being approximately 50:1. Namely, In optical pickup device according to the invention, it is preferable that the ratio of $T_P:R_P$ in the polarizing film has a ratio less than 10:1 because the needed minimum optical intensity is obtained when $T_P$ are $R_S$ are set in the overlapped regions (1) and (2) for the polarizing film.

Furthermore, when the ideal optical disc is used, the intensity $I_B$ becomes double than that of the non-polarizing optics system when an ideal optical disc is used.

What is claimed is:

1. An optical pickup device comprising:

a light source which mainly irradiates a linearly polarized light;

a polarizing optics system including a polarization beam splitter and a quarter-wave plate for receiving the linearly polarized light and converting the linearly polarized light into a circularly polarized light as a incident light;

an objective lens for receiving and irradiating said incident light to an optical disc which collects a reflected light from the optical disc and returns the reflected light back to said polarizing optics system; and said polarizing optics system which converts the reflected light circularly polarized into a linearly polarized light as a returned light to divide the returned light from a optical path of the incident light to introduce the returned light onto a photodetector, characterized in that said polarization beam splitter comprises a polarizing film having optical properties of transmittance and reflectivity satisfying the following formulas (1) and (2):

$$T_P\times\{D_S\times R_S+D_P\times(1-T_P)\}\geq I_B \qquad (1)$$

$$T_P\times R_S\geq 2I_B \qquad (2)$$

under conditions $T_P+R_P=1$ and $R_S+T_S=1$ except an absorbancy, wherein $T_P$ denotes a transmittance of a P-polarized light component in said incident light, $T_S$ denotes a transmittance of a S-polarized light component in said incident light, $R_P$ denotes a reflectivity of a P-polarized light component in said incident light, $R_S$ denotes a reflectivity of a S-polarized light component in said incident light, $I_B$ denotes an optical intensity of a returned light in a non-polarizing optics system existing if both said polarization beam splitter of said polarizing optics system and said quarter-wave plate are replaced by the non-polarization beam splitter, $D_P$ denotes a ratio of the P-polarized light component in said incident light of a reflected light from said optical disc to said polarization beam splitter, and $D_S$ denotes a ratio of the S-polarized light component in said incident light of a reflected light from said optical disc to said polarization beam splitter.

2. An optical pickup device according to claim 1, wherein said transmittance $T_P$ of said P-polarized light component to said reflectivity $R_P$ of said P-polarized light component of $T_P:R_P$ in said polarizing film has a ratio less than 10:1.

* * * * *